United States Patent [19]
Wilson et al.

[11] Patent Number: 5,094,257
[45] Date of Patent: Mar. 10, 1992

[54] INSTANT PORTA-PERM GARAGE

[76] Inventors: Marguerite Wilson; John F. Galler; Raymond J. Galler; Randolph B. Galler; Cheyenne Galler, all of Rte. 3, Box 125, Live Oak, Fla. 32060; Bronwyn G. Welkner, 9981 SW. 157 Ter., Miami, Fla. 33157

[21] Appl. No.: 593,738

[22] Filed: Oct. 5, 1990

[51] Int. Cl.⁵ .................................... E04H 15/06
[52] U.S. Cl. ...................... 135/88; 135/104; 135/113
[58] Field of Search ............... 135/88, 90, 102, 104, 135/107, 109, 112, 113

[56] References Cited

U.S. PATENT DOCUMENTS

| | | | |
|---|---|---|---|
| 2,571,362 | 10/1951 | Hervey | 135/88 X |
| 2,598,940 | 6/1952 | Robie | 135/88 X |
| 2,631,057 | 3/1953 | Weaklend | 135/88 X |
| 3,070,106 | 12/1962 | Johnston | 135/112 X |
| 3,212,512 | 10/1965 | Morris | 135/118 |
| 4,077,418 | 3/1978 | Cohen | 135/109 X |
| 4,088,363 | 5/1978 | Palmer | 135/88 X |

FOREIGN PATENT DOCUMENTS

| | | | |
|---|---|---|---|
| 0553441 | 12/1958 | Italy | 135/88 |
| 0056962 | 9/1944 | Netherlands | 135/88 |
| 0889455 | 2/1962 | United Kingdom | 135/112 |

Primary Examiner—David A. Scherbel
Assistant Examiner—Lan Mai
Attorney, Agent, or Firm—Richard C. Litman

[57] ABSTRACT

A portable and temporarily installable vehicle cover is supported by a frame, which in turn is supported by brackets attached to the vehicle rocker panels or floor pan. Alternatively the brackets may be secured to stakes which are secured in the ground near the midpoint of each side of the vehicle. The frame is formed of a forward, central and rear support. Each end of the forward support is secured to the brackets, while each end of the rear support is secured to the corresponding ends of the front support. The front and rear supports provide support for the cover, while the cover itself serves to locate and support the center support. The frame may be formed of telescoping tubular sections joined by springs, enabling the entire apparatus to be disassembled and stored within otherwise unused space such as the interior of a vehicle bumper. Alternatively, the cover may be left in its erected state if secured to stakes, and one end may be opened to allow for the entrance or exit of a vehicle.

6 Claims, 3 Drawing Sheets

INSTANT PORTA-PERM GARAGE

FIELD OF THE INVENTION

This invention relates generally to shelters for vehicles, and more specifically to a portable, collapsible shelter which is generally supported by the vehicle when erected and may be contained within a compartment of the vehicle for storage.

BACKGROUND OF THE INVENTION

Increasing industrialization has led to increases in atmospheric pollution over the years, which has in turn made it increasingly difficult to protect vehicle finishes and the like when such vehicles are stored out of doors. Although great strides have been made in protective coatings, none are impervious to the effects of chemicals borne by the atmosphere. This has made it ever more important to protect such vehicle finishes by means of some sort of protective cover or shelter.

Vehicles which are in regular use, such as automobiles, may spend most of their time parked outside while the owner is at work, even if the vehicle is otherwise garaged at home. Ultraviolet radiation from the sun and urban industrial pollution will have a considerable adverse effect in such a situation. While various vehicle covers are known, they are typically little more than a fitted tarp which rests more or less completely upon the vehicle body.

This can lead to further problems, even if a person is conscientious about consistently using such a cover to protect the finish of a vehicle. Normally, such covers are made of a "breathable," i.e., microscopically porous, material which allows the passage of very fine contaminant particles and moisture through the material. This can cause problems if the material is in contact with the finish which it is intended to protect, since many of the contaminants are then held in contact with the vehicle finish.

Moisture proof materials provide no better solution, as they will tend to trap condensed moisture against the vehicle finish. Even the highest quality finishing materials will eventually be damaged by continuous contact with water, particularly if that water contains some amounts of contaminants or corrosives.

The need arises for a portable vehicle shelter which can be quickly and easily erected or folded for storage by a single person and which can be easily carried within the vehicle for use wherever the vehicle may be parked. The shelter may be stored in a normally unused space within the vehicle, therefore taking up no otherwise usable space. Moreover, the shelter should be supported by its own structure in order to prevent the material from coming in contact with the finish of the vehicle.

DESCRIPTION OF THE RELATED ART

Herzer U.S. Pat. No. 1,719,055 discloses a car cover or shelter and tent which may be contained within an automobile bumper, generally as envisioned by the present invention. However, this cover rests upon the surface of the vehicle and is not supported away from the finish of the vehicle by other supports. Moreover, the device of the Herzer patent requires a special vehicle bumper; it would not be possible to modify an existing bumper for the storage of the Herzer shelter as disclosed in that patent.

Gray U.S. Pat. No. 2,508,757 discloses an automobile sun shade. This device is supported clear of the surface of the vehicle, but requires several support posts attached to various points on the vehicle. Moreover, no provision is made for the protection of any areas of the vehicle other than the upper surfaces.

Keller U.S. Pat. No. 2,620,007 discloses an automobile cover which rests entirely upon the surface of the vehicle. This cover is disclosed to be of a clear and waterproof plastic material, thereby permitting the problems outlined in the Background of the Invention above to occur. The cover is placed over the car by means of relatively long straps which then must be stored within a pocket at one end of the cover.

Ross et al. U.S. Pat. No. 4,732,421 discloses an automobile cover which is stored upon a spring biased reel externally attached to one bumper of the car. Again, no provision is made for preventing the cover material from coming in contact with the finish of the car. In addition, it is not seen how a cover of sufficient lateral dimension so as to extend from one lower side of the vehicle, across the top, and down to the opposite lower side, can be made to retract smoothly onto a reel which is of a considerably narrower dimension.

None of the above noted patents, either singly or in combination, are seen to disclose the specific arrangement of concepts disclosed by the present invention.

SUMMARY OF THE INVENTION

By the present invention, an improved portable vehicle shelter is disclosed.

Accordingly, one of the objects of the present invention is to provide an improved shelter for vehicles which is substantially formed of a relatively thin and flexible material.

Another of the objects of the present invention is to provide a shelter for vehicles which may be quickly and easily erected and stored.

Still another of the objects of the present invention is to provide a shelter for vehicles which does not contact the finish of the vehicle in its erected state.

Yet another of the objects of the present invention is to provide a shelter for vehicles the frame of which is supported entirely by the vehicle.

An additional object of the present invention is to provide a shelter for vehicles which may be stored within the enclosed space of a vehicle bumper.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
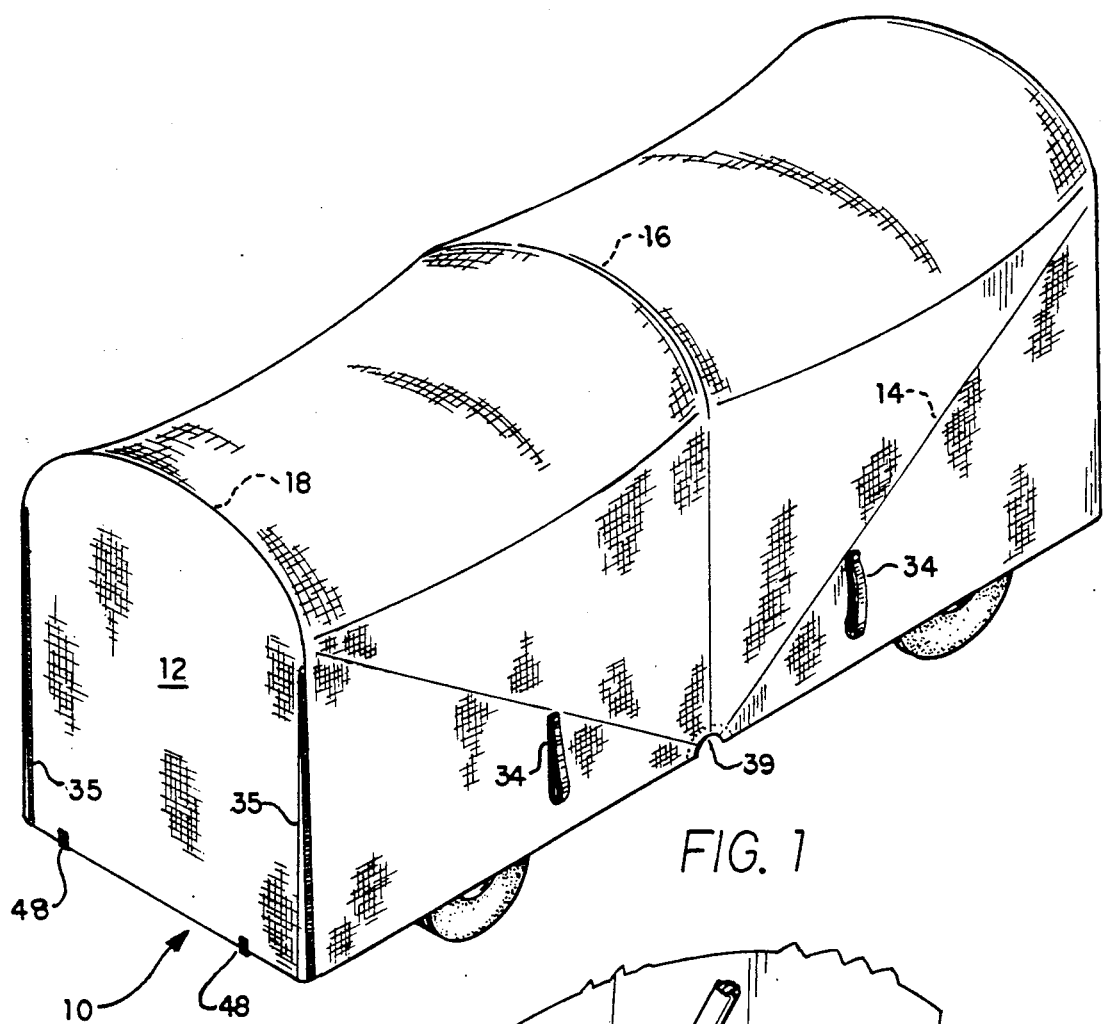
FIG. 1 is a perspective view of the shelter erected over a vehicle.
Figure 6:
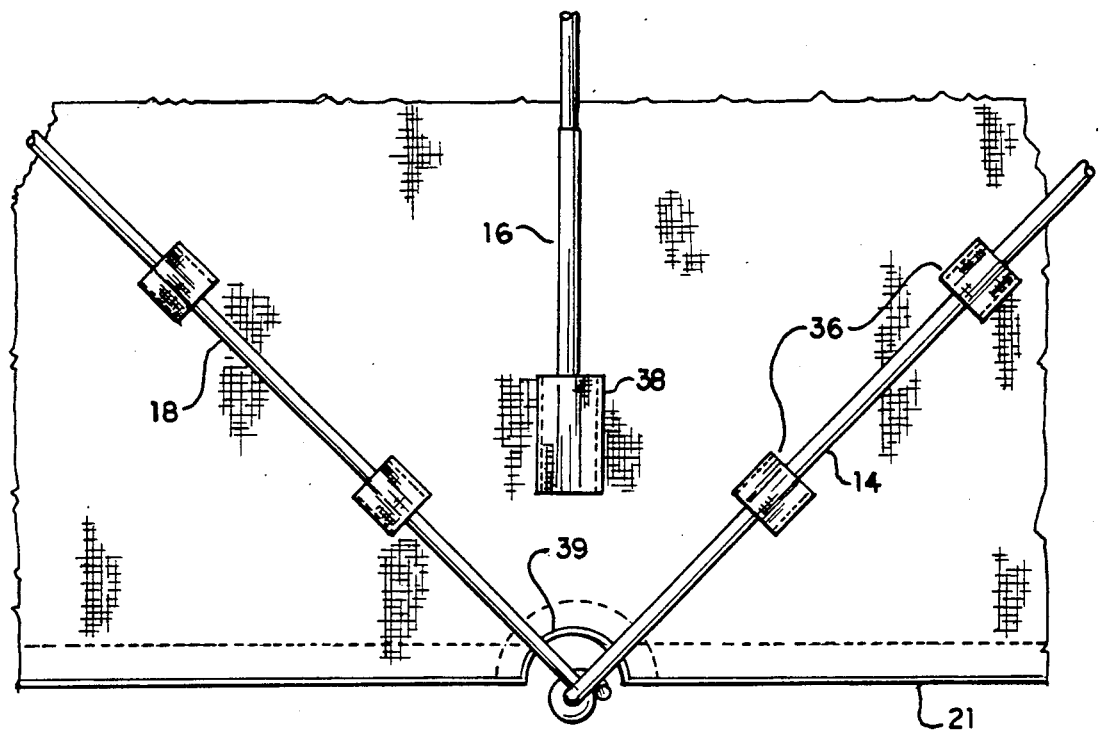
FIG. 6 is a partial interior view of the erected shelter, showing the method of securing the shelter material to the support frame.

Referring now to the drawings, particularly FIGS. 1 and 6 of the drawings, the present invention will be seen to relate to an improved portable vehicle shelter 10. Shelter 10 comprises cover 12 and forward, center and rear supports 14, 16, and 18 respectively. Cover 12 is of generally rectangular plan form, with depending sides and ends in order to generally enclose any vehicle contained therein, and may be equipped with straps 34 to provide assistance in erecting or folding shelter 10. Straps 34 may also serve to secure shelter 10 in its collapsed and folded state.

Figure 2:
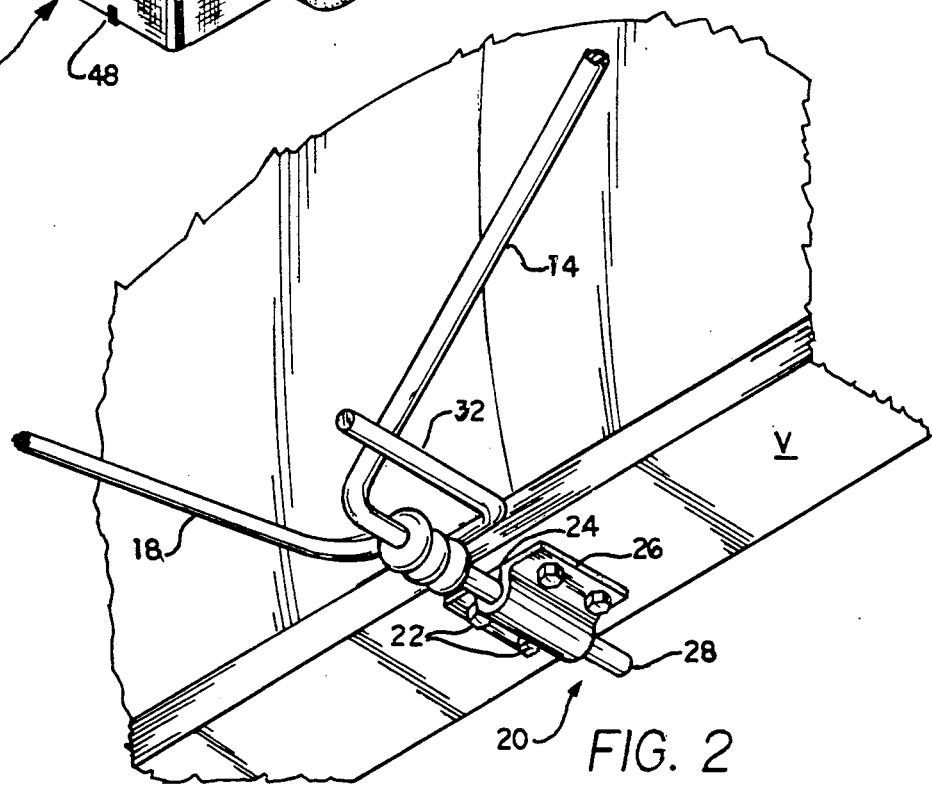
FIG. 2 is a perspective view of the shelter frame attachment to the underside of a vehicle.

Front support 14 and rear support 18 are pivotally secured to the vehicle V by means of brackets 20, and are generally formed in an inverted U configuration sufficiently large to clear the front and rear ends of vehicle V when pivoted from brackets 20 as further described below. Such an inverted U shape provides an arched structure more capable of supporting any snow or other loads which may occur. Brackets 20, more clearly shown in FIG. 2, are secured to each edge of the underside of vehicle V at the approximate midpoint of the length of the vehicle, in an area generally known as the rocker panel of the vehicle. Brackets 20 may be secured by means of bolts 22, welding or other suitable means.

Each bracket 20 comprises a central passage 24 formed to accept one end of forward support 14, and flanges 26 extending to either side providing for attachment. Brackets 20 are positioned on opposite sides of vehicle V so that central passages 24 are generally parallel to the lateral axis of vehicle V and concentric with one another. Each end 28 of forward support 14 is formed so as to fit closely within and cooperate with each respective passage 24 of each of the two brackets 20 mounted upon vehicle V.

Rear support 18 does not attach to a corresponding bracket as does forward support 14, but rather secures to the end 28 of forward support 14 in order to eliminate the need for additional brackets and the labor involved in securing them to vehicle V, while still allowing the pivotal axes of both forward support 14 and rear support 18 to be essentially concentric. Each end of rear support 18 forms a coil 30 about the corresponding end 28 of forward support 14, thus serving to secure forward and rear supports 14 and 18 together. Coils 30 terminate in an extension 32 which projects away from bracket 20 and in front of the lower end of front support 14. This construction permits both forward support 14 and rear support 18, as well as cover 12 if attached, to be pivoted rearward, thereby uncovering any vehicle V beneath.

When shelter 10 is to be erected, forward support 14 is first pivoted forward. At an intermediate point in the arcuate path of forward support 14, its lower portion will engage extension 32 of rear support 18, thereby causing rear support 18 to rise also. Coil 30 will help cushion any sudden shock of contact between forward support 14 and extension 32 of rear support 18.

Figure 3:
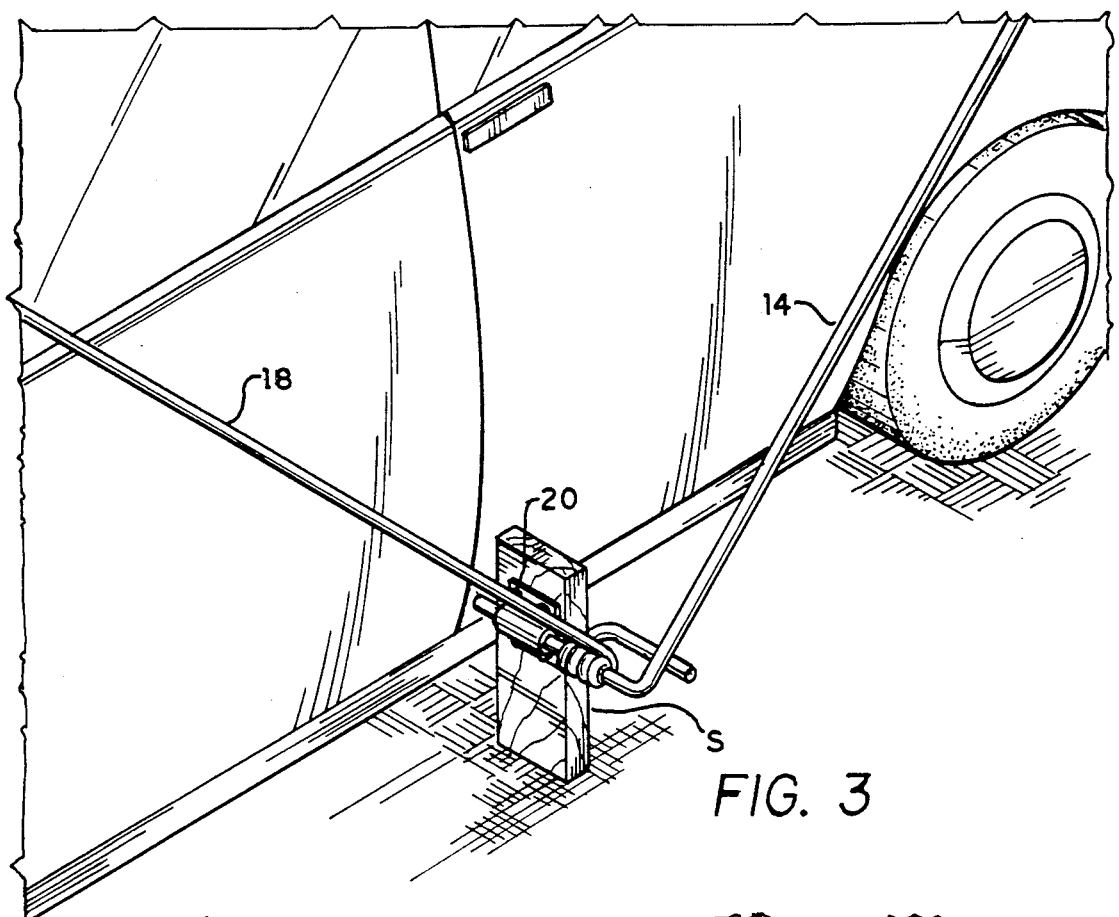
FIG. 3 is a perspective view of an alternative method of securing the shelter frame.

Bracket 20 may be alternatively attached to a stake S, as shown in FIG. 3, if direct attachment to vehicle V is not desired. By positioning stake S within a few inches of the side of vehicle V and attaching bracket 20 at the approximate height of the bottom of the rocker panel of vehicle V, an equivalent pivotal point may be provided for forward and rear supports 14 and 18. Rather than folding the entire shelter 10 in such a situation in order to allow for the removal or storage of a vehicle, ZIPPERS 35 or other temporary securing means provided at the rear vertical edges of cover 12 may be opened, thus permitting the rear end of cover 12 to be opened while the remainder of cover 12 remains erected.

FIG. 6 discloses the method of attachment of cover 12 to forward and rear supports 14 and 18, and in turn, the attachment of center support 16 to cover 12. A plurality of sleeves 36 may be sewn or otherwise secured at appropriate locations within cover 12, permitting forward, central and rear supports 14, 16 and 18 respectively, to be properly positioned to support cover 12. However, center support 16 is itself supported by pockets 38 which are sewn or otherwise secured to the inside surface of cover 12 immediately above the junction of forward and rear supports 14 and 18. In this manner, if center support 16 is not needed it may be easily eliminated since center support 16 need not be secured directly to any other support members 14 or 18. A semicircular cutout 39 is provided at the lower edges of each side of cover 12 at the junction of front and rear supports 14 and 18 for clearance.

Figure 5A:
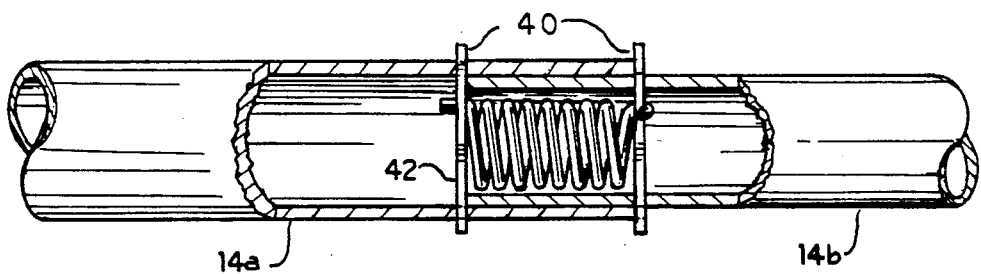
FIG. 5A is a partially cut away view of an assembled connecting joint between tubular support sections.
Figure 5B:
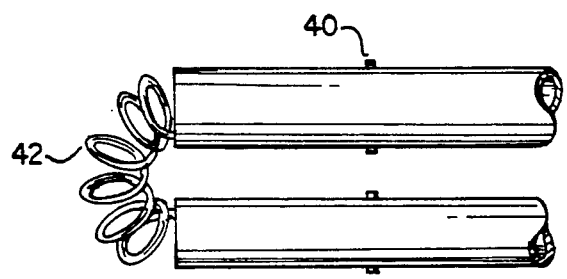
FIG. 5B is a view of the assembly of FIG. 5A in its folded and stored state.

Forward, center and rear supports 14, 16 and 18 may be formed of continuous lengths of any suitable solid or tubular material as is well known in the art, or alternatively may be formed of shorter tubular sections arranged to telescope together for assembly as shown in FIGS. 5A and 5B. Alternative forward support telescoping sections 14a and 14b are shown in FIGS. 5A and 5B, but it is to be understood that this telescoping configuration may apply equally well to the construction of center and rear supports 16 and 18. As shown in FIG. 5A, support section 14a is formed of a hollow tube of an inside diameter which closely fits the outside diameter of section 14b. In this way the sections 14a and 14b may be assembled to form a longer relatively rigid section.

In order to prevent the insertion of section 14b into section 14a to a greater depth than desired, pins 40 are installed within each end of sections 14a and 14b. Pins 40 pass across the diamter of sections 14a and 14b and extend outside the outer wall of sections 14a and 14b, thus preventing section 14b from being inserted into section 14a to too great a depth, or section 14a from passing over the outside of section 14b farther than desired.

Sections 14a and 14b are biased into a closely fitting relationship by spring 42, which is assembled in tension with sections 14a and 14b and tends to draw sections 14a and 14b together. The ends 42a and 42b of spring 42 are secured to pins 40 within each section 14a and 14b respectively, thereby retaining sections 14a and 14b together even when in their disassembled state. Spring 42 permits sections 14a and 14b to be pulled apart and folded together when disassembly is desired, thus saving space when storage of shelter 10 is desired. Alternatively, pins 40 and springs 42 may be omitted from various sections of forward, center and rear supports 14, 16 and 18, thus providing for those sections to be completely telescoped within one another for storage.

Figure 4:
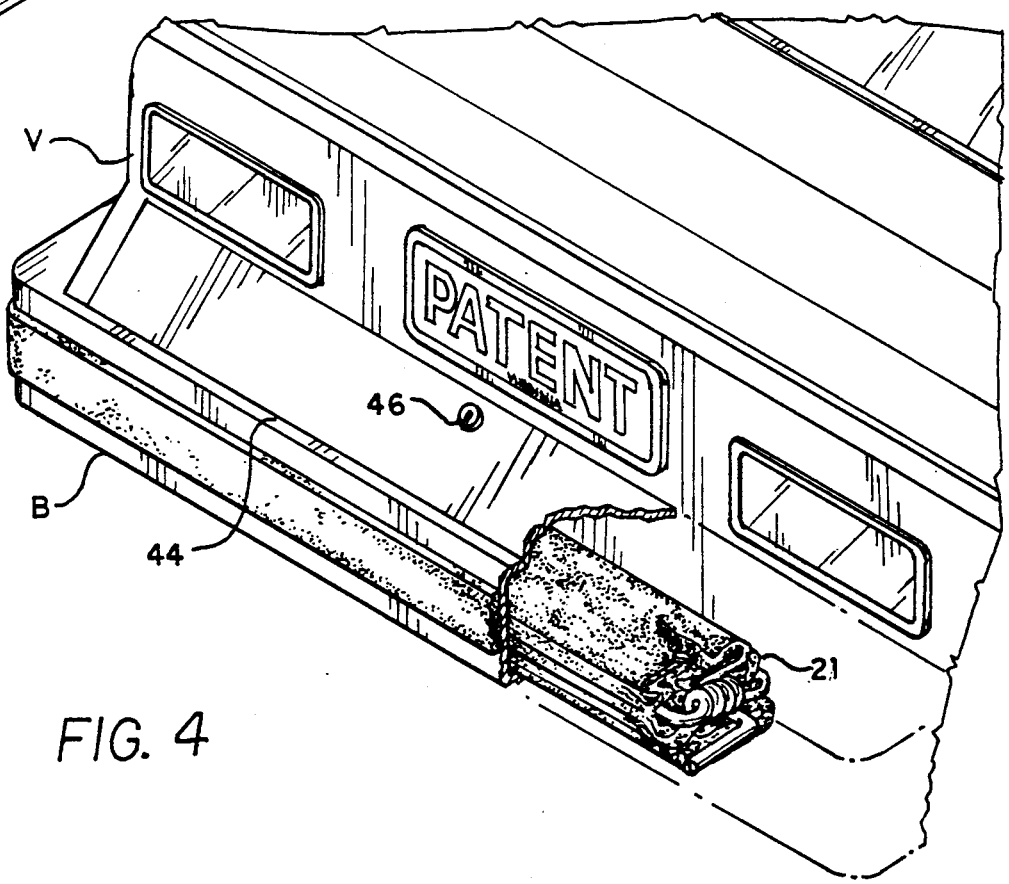
FIG. 4 is a perspective view, partially cut away, of a vehicle bumper showing the use of the interior of such a bumper as storage for the vehicle shelter.

The compact storage of shelter 10 as described immediately above is desirable for many reasons, one of which is that it permits shelter 10 to be stored within a relatively small volume of previously unused space within vehicle V, such as the interior of a bumper B as shown in FIG. 4. With the advent of minimum low speed crashworthiness standards, automobile bumpers have become relatively bulky and extend some distance from the remainder of the automobile. Such bumpers are generally faired in to the remainder of the automobile body with trim sections of plastic or other material in order to conceal the relatively large gap which would otherwise exist between the bumper and the automobile body. The present invention envisions taking advantage of this otherwise unused space by providing for the storage of shelter 10 between the bumper B and the vehicle V. The standard trim panel mentioned above may be modified to serve as an access door 44 to the space between bumper B and vehicle V, and may be secured by a lock 46 in a manner known in the art.

Shelter 10 may be assembled by opening door 44 of bumper B and removing the collapsed or folded components of shelter 10 which may be stored therein, or alternatively removing shelter 10 from any other storage area in which it may have been stored. Cover 12 normally remains installed and gathered over the collapsed and folded supports 14, 16 and 18 by means of sleeves 36 and pockets 38. Supports 14, 16 and 18 may be extended to form the general structure 10, thus causing cover 12 to extend simultaneously. Forward support extensions 28 may then be installed within passages 24 of brackets 20.

The assembled but folded shelter 10 thus formed may then be drawn up and over vehicle V with the assistance of straps 34. As forward support 14 is brought forward it will engage rear support extension 32, thus causing rear support 18 to raise to its desired position. Center support 16 is automatically moved to its proper position due to the tension in the surface of cover 12 as it is brought to its fully extended position to cover vehicle V. The forward and rear ends of cover 12 may be secured to vehicle V by any suitable means, such as hook and loop material 48.

Shelter 10 may be easily removed from vehicle V by essentially reversing the above steps. Any securing means is detached and shelter 10 may be folded to a collapsed state. Forward support ends 28 are removed from brackets 20 and the various supports 14, 16 and 18 may then be collapsed and folded within cover 12 and the folded shelter 10 stored within bumper B of vehicle V and secured by door 44 and lock 46, or stored as desired in any other suitable location.

It is to be understood that the present invention is not limited to the sole embodiment described above, but encompasses any and all embodiments within the scope of the following claims.

I claim:
1. In combination with a vehicle,
a portable, temporarily installable and foldable shelter,
said shelter comprising a cover entirely supported by forward, center and rear supports,
said vehicle having an underside with lateral edges,
a bracket attached to the underside of said vehicle near a midpoint of each lateral edge of said vehicle underside,
said forward support having two ends each closely cooperating with said bracket,
said rear support having two ends each terminating in a coil and extension,
said coils surrounding said ends of said forward support and said extensions extending in front of said forward support, and
said cover containing sleeves for the securing of said forward, central and rear supports and pockets for the containment and support of said central support.
2. The shelter of claim 1 wherein;
said cover includes straps providing assistance in erecting and folding said shelter.
3. The shelter of claim 1 wherein;
said forward, central and rear supports are formed of telescoping sections,
each of said telescoping sections having at least one end secured to the cooperating end of another of said telescoping sections by a spring acting in tension, whereby
said spring tends to draw said cooperating ends of said telescoping sections together.
4. The shelter of claim 1 wherein;
each of said brackets is attached to a stake, and
each of said stakes is secured to the surface adjacent said vehicle underside lateral edge midpoints.
5. The shelter of claim 1 wherein;
said cover includes means capable of temporarily securing at least one end of said cover to the remainder of said cover.
6. The vehicle of claim 1 wherein;
said vehicle includes a bumper,
said bumper includes a storage space secured by a door, whereby
said shelter may be disassembled and stored within said vehicle bumper storage space when not in use.

* * * * *